United States Patent
Liu et al.

(10) Patent No.: US 12,468,512 B2
(45) Date of Patent: *Nov. 11, 2025

(54) SOFTWARE PLATFORM-SPECIFIC FUNCTION DISASSEMBLING AND CALLING METHOD FOR THIRD-PARTY PROGRAM LIBRARY AND CALLING SYSTEM

(71) Applicant: SHANGHAI TOSUN TECHNOLOGY LTD., Shanghai (CN)

(72) Inventors: Chu Liu, Shanghai (CN); Yueyin Xie, Shanghai (CN); Mang Mo, Shanghai (CN)

(73) Assignee: SHANGHAI TOSUN TECHNOLOGY LTD., Shanghai (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/267,116

(22) PCT Filed: Aug. 28, 2022

(86) PCT No.: PCT/CN2022/115342
§ 371 (c)(1),
(2) Date: Jun. 14, 2023

(87) PCT Pub. No.: WO2023/051127
PCT Pub. Date: Apr. 6, 2023

(65) Prior Publication Data
US 2023/0401042 A1    Dec. 14, 2023

(30) Foreign Application Priority Data
Sep. 29, 2021    (CN) .......................... 202111147971.5

(51) Int. Cl.
*G06F 8/36*    (2018.01)
*G06F 8/41*    (2018.01)

(52) U.S. Cl.
CPC . *G06F 8/36* (2013.01); *G06F 8/41* (2013.01)

(58) Field of Classification Search
CPC ..................................... G06F 8/36; G06F 8/41
(Continued)

(56) References Cited

U.S. PATENT DOCUMENTS

| | | | |
|---|---|---|---|
| 5,634,114 A | 5/1997 | Shipley | |
| 8,504,543 B1* | 8/2013 | Andreessen | ............ G06F 9/541 |
| | | | 707/706 |

(Continued)

FOREIGN PATENT DOCUMENTS

| | | | |
|---|---|---|---|
| CN | 101165648 A | 4/2008 | |
| CN | 102831343 A | 12/2012 | |

(Continued)

OTHER PUBLICATIONS

Reif et al, "Call Graph Construction for Java Libraries", ACM, pp. 1-13 (Year: 2016).*

(Continued)

*Primary Examiner* — Anil Khatri
(74) *Attorney, Agent, or Firm* — Bayramoglu Law Offices

(57) ABSTRACT

A software platform-specific function disassembling and calling method for a third-party program library includes constructing a third-party program library, verifying legitimacy of the third-party program library, and calling the third-party program library. This realizes an automatic import solution for a function disassembling and a calling system of the third-party program library. For both a newly-added third-party program library and an existing third-party program library to which a function change is made, a software platform can automatically identify a function interface by only loading the third-party program library and without requiring a user to manually update a calling program. This method can ensure architectural stability of the (Continued)

software platform and avoid stability degradation caused by repeated modifications to the software platform.

15 Claims, 2 Drawing Sheets

(58) Field of Classification Search
USPC .................................................. 717/120–140
See application file for complete search history.

(56) References Cited

U.S. PATENT DOCUMENTS

| | | | | |
|---|---|---|---|---|
| 8,601,433 | B2* | 12/2013 | Son | G06F 8/71 |
| | | | | 717/124 |
| 9,065,915 | B1* | 6/2015 | Lillard | H04M 3/42382 |
| 9,258,668 | B2* | 2/2016 | Mall | H04L 67/34 |
| 9,484,065 | B2* | 11/2016 | McDowell | H04N 21/8549 |
| 10,114,637 | B1* | 10/2018 | Willson | G06F 8/71 |
| 10,564,950 | B1* | 2/2020 | Liu | G06F 11/362 |
| 10,649,741 | B2* | 5/2020 | Duggal | G06F 8/316 |
| 10,867,035 | B1* | 12/2020 | Chauhan | G06F 3/04883 |
| 11,500,618 | B2* | 11/2022 | Rodgers | G06F 9/541 |
| 11,711,554 | B2* | 7/2023 | Neumeier | H04N 21/472 |
| | | | | 725/19 |
| 2010/0229163 | A1 | 9/2010 | Rolland et al. | |
| 2015/0339140 | A1 | 11/2015 | Murray et al. | |
| 2018/0217851 | A1 | 8/2018 | Sirajuddin | |
| 2020/0293631 | A1* | 9/2020 | Polisetty | G06F 21/105 |
| 2021/0026710 | A1 | 1/2021 | Gómez et al. | |
| 2021/0073374 | A1 | 3/2021 | Mookken et al. | |
| 2021/0263779 | A1* | 8/2021 | Haghighat | G06F 9/5061 |

FOREIGN PATENT DOCUMENTS

| | | |
|---|---|---|
| CN | 104598247 A | 5/2015 |
| CN | 106648563 A | 5/2017 |
| CN | 107766164 A | 3/2018 |
| CN | 111506357 A | 8/2020 |
| CN | 112363726 A | 2/2021 |
| CN | 112764797 A | 5/2021 |
| CN | 113448655 A | 9/2021 |
| CN | 113867719 A | 12/2021 |
| JP | 2001022560 A | 1/2001 |
| JP | 2018538583 A | 12/2018 |

OTHER PUBLICATIONS

Knight, "Building Software With Scons", IEEE, pp. 1-10 (Year: 2005).*

Ntousakis et al, "Demo: Detecting Third-Party Library Problems with Combined Program Analysis", ACM, pp. 1-3 (Year: 2021).*

Backes et al, "Reliable Third-Party Library Detection in Android and its Security Applications", ACM, pp. 1-12 (Year: 2016).*

Rajabli et al, "Software Verification and Validation of Safe Autonomous Cars: A Systematic Literature Review", IEEE, pp. 1-23 (Year: 2023).*

* cited by examiner

SOFTWARE PLATFORM-SPECIFIC FUNCTION DISASSEMBLING AND CALLING METHOD FOR THIRD-PARTY PROGRAM LIBRARY AND CALLING SYSTEM

CROSS-REFERENCE TO THE RELATED APPLICATIONS

This application is the national phase entry of International Application No. PCT/CN2022/115342, filed on Aug. 28, 2022, which is based upon and claims priority to Chinese Patent Applications No. 202111147971.5, filed on Sep. 29, 2021, the entire contents of which are incorporated herein by reference.

TECHNICAL FIELD

The present disclosure relates to the technical field of computers, and specifically, to a software platform-specific function disassembling and calling method for a third-party program library, and a calling system.

BACKGROUND

A Windows-based software platform expands its function by importing a third-party program library. For an interface function exported from the third-party program library, the software platform needs to know a definition of the interface function and update a calling program before calling a function of the third-party program library.

For a newly-added third-party program library or an existing third-party program library that has been upgraded, as the interface function changes, a software platform developer has to manually update the calling program to call a file function of the corresponding third-party program library. In this way, the software platform needs to continuously update the calling program based on the third-party program library to maintain compatibility between the software platform and a third-party program, resulting in a heavy workload and low efficiency.

Therefore, to resolve the above technical problems, a software platform-specific function disassembling and calling method for a third-party program library, and a calling system need to be designed.

SUMMARY

The present disclosure is intended to provide a software platform-specific function disassembling and calling method for a third-party program library, and a calling system.

In order to resolve the above technical problem, the present disclosure provides a software platform, a third-party program library, a calling system, and a software platform-specific function disassembling and calling method for a third-party program library, including: constructing a third-party program library, verifying legitimacy of the third-party program library, and calling the third-party program library.

The present disclosure has following beneficial effects: The present disclosure constructs a third-party program library, verifies legitimacy of the third-party program library, and calls the third-party program library. This realizes an automatic import solution for a function disassembling and calling system of the third-party program library. For both a newly-added third-party program library and an existing third-party program library to which a function change is made, a software platform can automatically identify a function interface only by loading the third-party program library, without requiring a user to manually update a calling program. This method can ensure architectural stability of the software platform and avoid stability degradation caused by repeated modifications to the software platform.

Other features and advantages of the present disclosure will be described in the following description, and some of these will become apparent from the description or be understood by implementing the present disclosure. The objectives and other advantages of the present disclosure can be implemented or obtained by structures specifically indicated in the description and accompanying drawings.

In order to make the above purposes, features, and advantages of the present disclosure clearer and more understandable, the present disclosure is described in detail below using preferred examples with reference to the accompanying drawings.

BRIEF DESCRIPTION OF THE DRAWINGS

To describe the technical solutions in the specific implementations of the present disclosure or the prior art more clearly, the accompanying drawings required for describing the specific implementations or the prior art are briefly described below. Apparently, the accompanying drawings in the following description show merely some implementations of the present disclosure, and a person of ordinary skill in the art may still derive other accompanying drawings from these accompanying drawings without creative efforts.

DETAILED DESCRIPTION OF THE EMBODIMENTS

In order to make the objectives, technical solutions, and advantages of the embodiments of the present disclosure clearer, the technical solutions in the present disclosure are described clearly and completely below with reference to the accompanying drawings. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Embodiment 1

Figure 1:
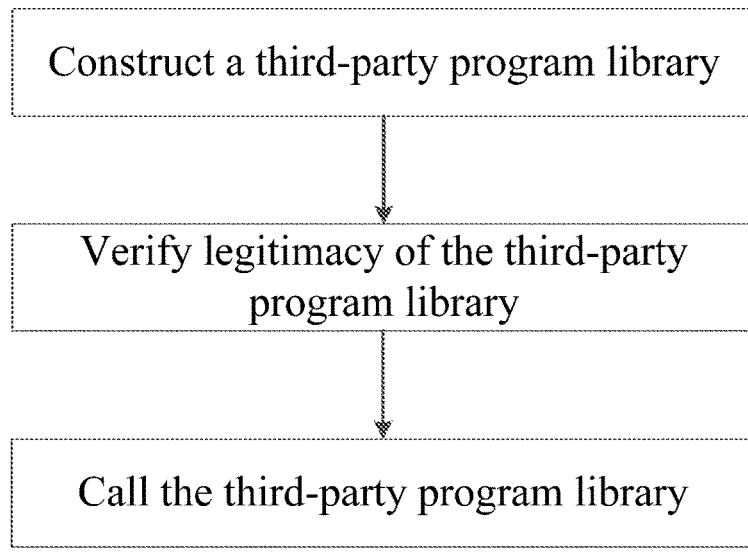
FIG. 1 is a flowchart of a software platform-specific function disassembling and calling method for a third-party program library according to the present disclosure.

FIG. 1 is a flowchart of a software platform-specific function disassembling and calling method for a third-party program library according to the present disclosure.

As shown in FIG. 1, Embodiment 1 provides a software platform-specific function disassembling and calling method for a third-party program library, including: constructing a third-party program library; verifying legitimacy of the third-party program library; and calling the third-party program library. This realizes an automatic import solution for a function disassembling and calling system of the third-party program library. For both a newly-added third-party program library and an existing third-party program library to which a function change is made, a software platform can automatically identify a function interface only by loading the third-party program library, without requiring a user to manually update a calling program. This method can ensure architectural stability of the software platform and avoid stability degradation caused by repeated modifications to the software platform.

Figure 2:
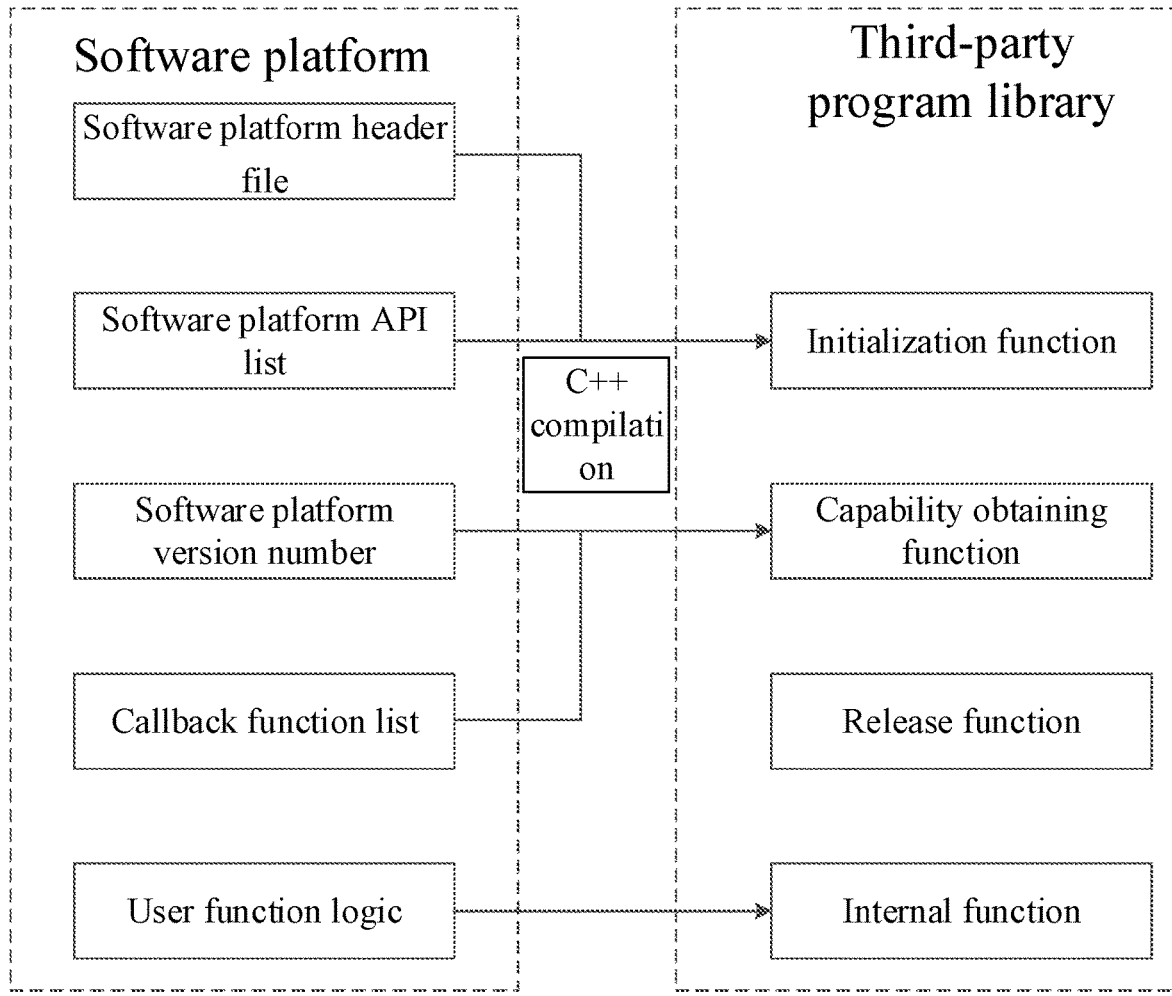
FIG. 2 is a flowchart of constructing a third-party program library according to the present disclosure.

FIG. 2 is a flowchart of constructing the third-party program library according to the present disclosure.

As shown in FIG. 2, in this embodiment, a method for constructing the third-party program library includes: calling a C++ compiler by using the software platform, to construct the third-party program library, that is, constructing an initialization submodule (containing an initialization function and a corresponding function), a capability obtaining submodule (containing a capability obtaining function and a corresponding function), an internal submodule (containing an internal function and a corresponding function), and a release submodule (containing a release function and a corresponding function) in the third-party program library by using the software platform. The release submodule is adapted to automatically release a resource requested by the third-party program library when the third-party program library is unloaded. The initialization submodule, the capability obtaining submodule, and the release submodule are public submodules, and the functions in the submodules can be automatically loaded and called by an external program. The function in the internal submodule is invisible externally.

In this embodiment, a method for constructing the initialization submodule by using the software platform includes; automatically generating the initialization submodule by using a software platform header file and a software platform API list on the software platform, such that after the initialization submodule is called, the third-party program library obtains address information of each API in the API list provided by the software platform for normal operations.

In this embodiment, a method for constructing the capability obtaining submodule by using the software platform includes, loading, by the software platform, a software platform version number and a list of a user logic callback submodule (the list of the user logic callback submodule is a user logic callback function list developed by a user on the software platform) to automatically generate the capability obtaining submodule, and obtaining version information of a software platform corresponding to the third-party program library, list information of the user logic callback submodule, and information of all internal submodules of the third-party program library when the external program calls the capability obtaining submodule.

In this embodiment, a method for constructing the internal submodule by using the software platform includes: generating the internal submodule based on a user function logic submodule (user function logic program) of the software platform. The internal submodule does not provide an public interface, and can only be obtained by the external program calling a capability obtaining function.

Figure 3:
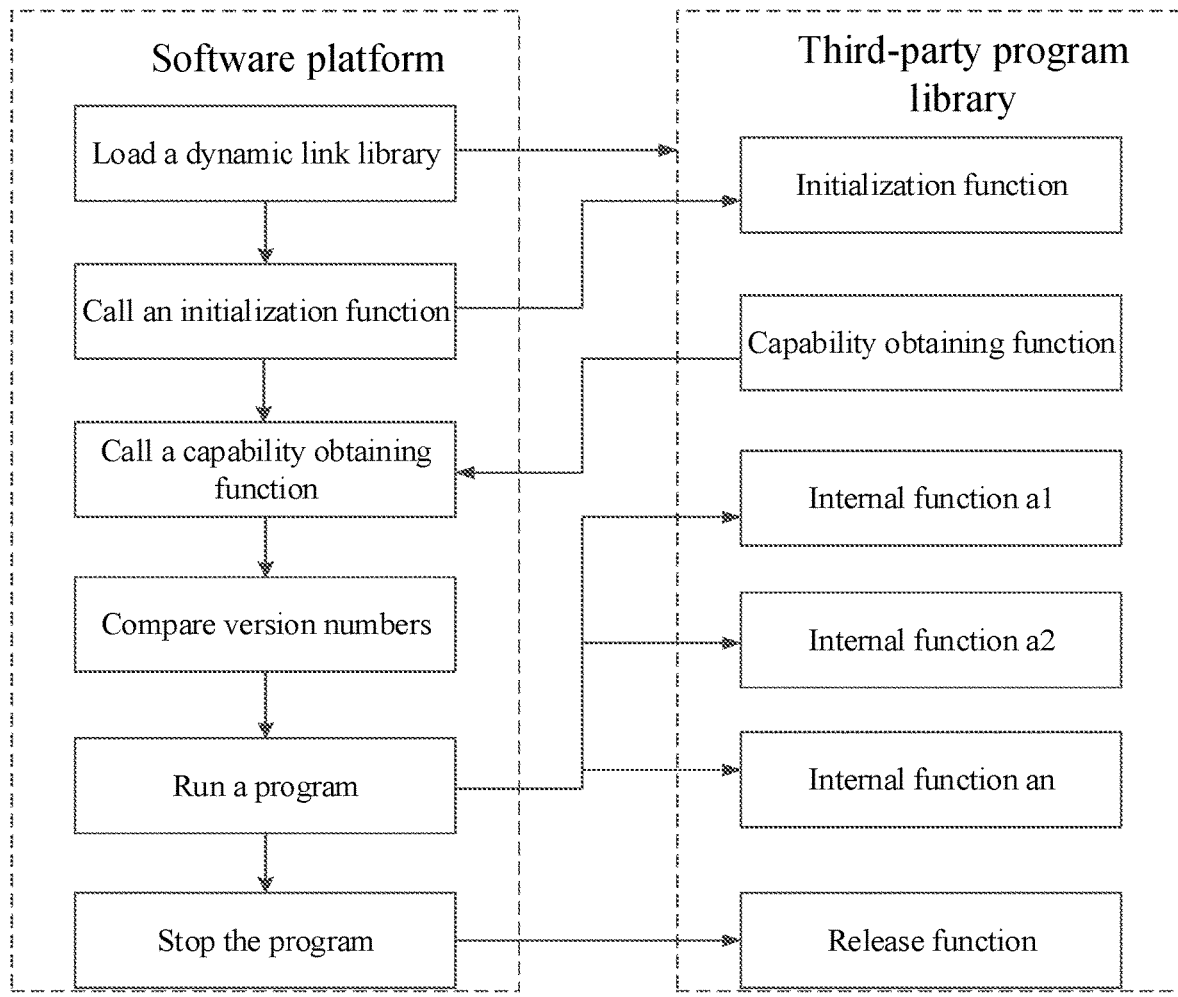
FIG. 3 is a flowchart of calling a third-party program library according to the present disclosure.

FIG. 3 is a flowchart of calling the third-party program library according to the present disclosure.

As shown in FIG. 3, in this embodiment, a method for verifying the legitimacy of the third-party program library includes: completing the calling process of the third-party program library through cooperation between the software platform and the third-party program library; loading the third-party program library onto the software platform by loading a dynamic link library on the software platform, such that the software platform calls the initialization submodule (initialization function) and the capability obtaining submodule (capability obtaining function) of the third-party program library to obtain the version number of the software platform corresponding to the third-party program library, the list of the user logic callback submodule (user logic callback function list), and address information and function parameter information of all the internal submodules (internal functions, such as internal function a1, internal function a2, . . . , and internal function an) in the third-party program library; and comparing, by the software platform, the obtained version number of the software platform corresponding to the third-party program library with the software platform version number, and if the version number of the software platform corresponding to the third-party program library is greater than the software platform version number, which indicates that the third-party program library is compiled by using a software platform that has a higher version than the third-party program library, stopping calling the third-party program library, or if the version number of the software platform corresponding to the third-party program library is not greater than the software platform version number, determining that the third-party program library is legal (meets a requirement) and continuing calling the third-party program library. When calling the third-party program library, the software platform first calls the capability obtaining function. When the third-party program library does not export any internal function, the software platform can know all callable function resources of the third-party program library. After obtaining the function resources of the third-party program library, the software platform can automatically identify internal function parameters of the third-party program library. In this way, a function calling function is automatically generated, which improves development efficiency of the software platform and the third-party program library, and reduces a possibility of an error. If a third-party program is generated by the software platform, the third-party program can be called by a software platform with a same version as or a higher version than the third-party program. In a calling process, the software platform automatically obtains a function parameter type of the third-party program library, and the user can freely call the third-party program library without updating the software platform. This method improves development and upgrade efficiency of a calling system.

In this embodiment, a method for calling the third-party program library includes: after the software platform continues calling the third-party program library, calling, by the software platform, the third-party program library based on the list of the user logic callback submodule (user logic callback function list) and a list of the internal submodule (internal function list) that are obtained from the third-party program library, and releasing the requested resource by calling the release submodule (release function) in the third-party program library after the calling is completed or when it is unnecessary to continue calling the third-party program library.

In this embodiment, the software platform includes: the software platform header file, the software platform API list containing API symbol information, the software platform version number, user logic generated by the user by using the software platform (which is represented by a callback function), and self logic designed by the user by using the software platform (which is represented by a common function). In a process of constructing the third-party program library on the software platform, it is first necessary to generate the initialization function whose source code is generated based on the software platform header file and the software platform API list containing the API symbol information. Then, it is necessary to generate the capability obtaining function whose source code is constituted by the software platform version number and symbol information of a user logic callback function. In addition, it is necessary to generate the release function that is responsible for releasing the requested resource before the third-party program library is unloaded. Finally, it is necessary to generate a series of internal functions, which are free logic designed by the user by using the software platform. After all the required functions are generated, the software platform calls a C/C++ compiler to compile the generated functions into an executable file of the third-party program library.

In this embodiment, the software platform further includes a dynamic link library loading function, a function calling function, a version number comparison function, a running function, and a stopping function. When calling the third-party program library, the software platform first needs to load the third-party program library by using the dynamic link library loading function. After successful loading, the initialization function of the third-party program library is called by using the function calling function, and then the capability obtaining function of the third-party program library is called by using the function calling function. The software platform version number and the user logic callback function that are compiled into the capability obtaining function in this embodiment are read and input to the software platform. The software platform learns a relationship between a constructed version number of the third-party program library and the software platform version number. The software platform continues calling the third-party program library only when the constructed version number is the same as the software platform version number or when the software platform version number is greater than the constructed version number of the third-party program library. Otherwise, the calling process is terminated. After the version number comparison function is executed and a flag indicating that the calling can be continued is returned, the software platform executes the running function. In a running process, the internal function of the third-party program library will be freely called by the software platform to provide various functions for the software platform. When the third-party program library is not needed, the software platform executes the stopping function to call the release function of the third-party program library. After the resource requested by the third-party program library is released, the calling process ends.

Specifically, in this embodiment, a third-party program library providing a CRC16 verification algorithm is taken as an example. The third-party program library internally contains a CRC16 verification algorithm. After loading the third-party program library, the software platform can provide the user with an interface function of the CRC16 verification algorithm, such that the interface function can be freely called by the user to calculate a check value of the CRC16 verification algorithm. Both a traditional software platform and an existing software platform provide the user with an available function in this manner. When new functions are added to the third-party program library with the CRC16 verification algorithm, for example, (1) a quantity of parameters of the CRC16 verification algorithm is modified from 3 to 4, and (2) a new CRC32 verification algorithm is added. For the traditional software platform, when the third-party program library changes, a developer needs to manually make following changes: adjusting the parameters of the CRC16 verification algorithm defined on the software platform accordingly to support four parameters, adding an interface definition of the new CRC32 verification algorithm, and recompiling a relevant component of the software platform to make the changes effective.

However, the user can learn, only after the software platform is updated, this change by loading a third-party function library of the new CRC16 verification algorithm by using an updated software platform, and synchronously modifies his/her script to support function upgrade, so as to ultimately achieve a desired function. This process includes software platform upgrade, which involves many uncontrollable factors such as a time overhead, a research and development overhead, software platform update, and redeployment. Therefore, the traditional software platform has low efficiency when the third-party function library is frequently updated. However, the software platform provided in this embodiment does not need to undergo the upgrade process. Specifically, the software platform directly loads the third-party program library with the updated CRC16 verification algorithm, obtains all API function definitions of the program library by using the capability obtaining function, including a function parameter definition of the updated CRC16 verification algorithm and a function definition of the newly-added CRC32 verification algorithm, and provides a latest definition of the third-party program library with the updated CRC16 verification algorithm to an end user. The user modifies his/her own program based on the latest definition. When the user calls CRC16 and CRC32 verification functions, the software platform provides accurate address and symbol information to ensure a smooth calling process. In this way, the desired function is achieved based on a new version of the third-party program library.

Embodiment 2

Based on Embodiment 1, Embodiment 2 provides a software platform for the software platform-specific function disassembling and calling method for a third-party program library in Embodiment 1. The software platform includes: a software platform header file, a software platform API list, a software platform version number, a list of a user logic callback submodule, a user function logic submodule, and a C++ compiler.

In this embodiment, the submodules contained in the software platform and their functions have been described in detail in Embodiment 1, and details are not described again in this embodiment.

Embodiment 3

Based on Embodiment 1, Embodiment 3 provides a third-party program library for the software platform-specific function disassembling and calling method for a third-party program library in Embodiment 1. The third-party program library includes an initialization submodule, a capability obtaining submodule, an internal submodule, and a release submodule.

In this embodiment, the submodules contained in the third-party program library and their functions have been described in detail in Embodiment 1, and details are not described again in this embodiment.

Embodiment 4

Figure 4:
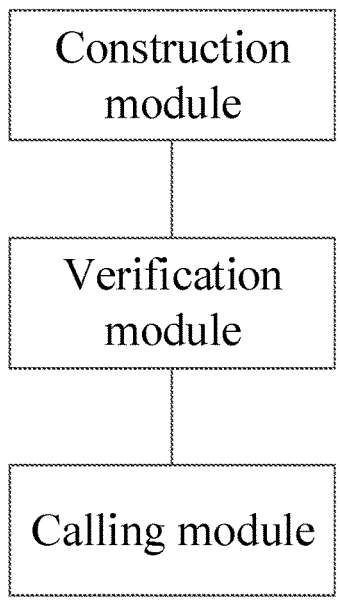
FIG. 4 is a functional block diagram of a calling system according to the present disclosure.

FIG. 4 is a functional block diagram of a calling system according to the present disclosure.

As shown in FIG. 4, based on Embodiment 1, Embodiment 4 provides a calling system using the software platform-specific function disassembling and calling method for a third-party program library in Embodiment 1. The calling system includes: a construction module configured to construct a third-party program library; a verification module configured to verify legitimacy of the third-party program library; and a calling module configured to call the third-party program library.

In this embodiment, specific functions of the modules have been described in detail in Embodiment 1, and details are not described again in this embodiment.

Embodiment 5

Based on the above embodiments, Embodiment 5 provides a calling apparatus, including a software platform and a third-party program library. The software platform is adapted to construct and call the third-party program library.

In this embodiment, functions of the software platform and the third-party program library have been described in detail in the above embodiments, and details are not described again in this embodiment.

To sum up, the present disclosure constructs and calls a third-party program library. This realizes an automatic import solution for a function disassembling and calling system of the third-party program library. For both a newly-added third-party program library and an existing third-party program library to which a function change is made, a software platform can automatically identify a function interface only by loading the third-party program library, without requiring a user to manually update a calling program. This method can ensure architectural stability of the software platform and avoid stability degradation caused by repeated modifications to the software platform.

In several embodiments provided in the present disclosure, it should be understood that the disclosed device and method may be implemented in other manners. The device embodiments described above are merely examples. For example, the flowcharts and block diagrams in the accompanying drawings show the possible implementation architecture, functions, and operations of the devices, methods, and computer program products according to multiple embodiments of the present disclosure. Each block in the flowcharts or block diagrams may represent a module, a program segment, or a part of code, and the module, the program segment, or the part of code contains one or more executable instructions used to implement specified logical functions. It should also be noted that, in some alternative implementations, the functions marked in the blocks may alternatively occur in a different order from that marked in the drawings. For example, two consecutive blocks can actually be executed in parallel, or sometimes can be executed in the reverse order, depending on the functions involved. It should also be noted that each block in the flowcharts and/or block diagrams and combinations of the blocks in the flowcharts and/or block diagrams may be implemented by a dedicated hardware-based system for executing specified functions or operations, or may be implemented by a combination of dedicated hardware and computer instructions.

In addition, all functional modules in the embodiments of the present disclosure may be integrated into one independent part, or each of the modules may exist alone physically, or two or more modules may be integrated into one independent part.

The functions, if implemented in the form of a software functional module and sold or used as a stand-alone product, may be stored in a computer-readable storage medium. Based on such understanding, the technical solutions of the present disclosure essentially or the part contributing to the prior art may be implemented in a form of a software product. The computer software product may be stored in a storage medium, and includes several instructions for enabling a computer device (which may be a personal computer, a server, a network device, or the like) to perform all or some steps of the methods described in the embodiments of the present disclosure. The foregoing storage medium includes: any medium that can store program code, such as a USB flash disk, a removable hard disk, a read-only memory (ROM), a random access memory (RAM), a magnetic disk, or an optical disc.

Under the inspiration of the above ideal examples of the present disclosure, a skilled person can absolutely make various changes and modifications through the above description content without departing from the scope of the technical idea of the present disclosure. The technical scope of the present disclosure is not limited to the content of the description, which must be determined according to the scope of the claims.

What is claimed is:

1. A software platform-specific function disassembling and calling method for a third-party program library, comprising:
constructing, by a construction module in a software platform of a server, a third-party program library;
verifying, by a verification module in the software platform, legitimacy of the third-party program library; and
calling, by a calling module in the software platform, the third-party program library;
wherein the constructing of the third-party program library comprises constructing, by the software platform, an initialization submodule, a capability obtaining submodule, internal submodules, and a release submodule in the third-party program library;
wherein the constructing of the capability obtaining submodule comprises:
loading, by the software platform, a software platform version number and a list of a user logic callback submodule to automatically generate the capability obtaining submodule, and obtaining version information of a software platform corresponding to the third-party program library, list information of the user logic callback submodule, and information of all internal submodules of the third-party program library when an external program calls the capability obtaining submodule; and
wherein the verifying of the legitimacy of the third-party program library comprises:
loading the third-party program library onto the software platform;
calling, by the software platform, the initialization submodule and the capability obtaining submodule of the third-party program library to obtain a version number of a software platform corresponding to the third-party program library, the list of the user logic callback submodule, and address information and function parameter information of all the internal submodules of the third-party program library; and
comparing, by the software platform, the obtained version number of the software platform corresponding to the third-party program library with the software platform version number; stopping calling the third-party program library if the version number of the software platform corresponding to the third-party program library is greater than the software platform version number, and continuing calling the third-party program library if the version number of the software platform corresponding to the third-party program library is not greater than the software platform version number;

wherein the release submodule is adapted to automatically release a resource requested by the third-party program library when the third-party program library is unloaded.

2. The software platform-specific function disassembling and method for a third-party program library according to claim 1, wherein the constructing of the initialization submodule comprises:

generating the initialization submodule by using a software platform header file and a software platform application programming interface (API) list on the software platform, such that after the initialization submodule is called, the third-party program library obtains address information of each API in the API list provided by the software platform.

3. A software platform for the software platform-specific function disassembling and calling method for a third-party program library according to claim 2, comprising:

a software platform header file, a software platform API list, a software platform version number, a list of a user logic callback submodule, and a user function logic submodule.

4. A third-party program library for the software platform-specific function disassembling and calling method for a third-party program library according to claim 2, comprising:

an initialization submodule, a capability obtaining submodule, an internal submodule, and a release submodule.

5. The software platform-specific function disassembling and calling method for a third-party program library according to claim 2, wherein the constructing of the capability obtaining submodule comprises:

loading, by the software platform, a software platform version number and a list of a user logic callback submodule to generate the capability obtaining submodule, and obtaining version information of a software platform corresponding to the third-party program library, list information of the user logic callback submodule, and information of all internal submodules of the third-party program library when an external program calls the capability obtaining submodule.

6. A software platform for the software platform-specific function disassembling and calling method for a third-party program library according to claim 5, comprising:

a software platform header file, a software platform API list, a software platform version number, a list of a user logic callback submodule, and a user function logic submodule.

7. A third-party program library for the software platform-specific function disassembling and calling method for a third-party program library according to claim 5, comprising:

an initialization submodule, a capability obtaining submodule, an internal submodule, and a release submodule.

8. The software platform-specific function disassembling and calling method for a third-party program library according to claim 5, wherein the constructing of the internal submodule comprises:

generating the internal submodule based on a user function logic submodule of the software platform.

9. A software platform for the software platform-specific function disassembling and calling method for a third-party program library according to claim 8, comprising:

a software platform header file, a software platform API list, a software platform version number, a list of a user logic callback submodule, and a user function logic submodule.

10. A third-party program library for the software platform-specific function disassembling and calling method for a third-party program library according to claim 8, comprising:

an initialization submodule, a capability obtaining submodule, an internal submodule, and a release submodule.

11. The software platform-specific calling method for function disassembling of a third-party program library according to claim 1, wherein the calling of the third-party program library comprises:

after the software platform continues calling the third-party program library, calling, by the software platform, the third-party program library based on the list of the user logic callback submodule and a list of the internal submodule that are obtained from the third-party program library, and releasing the requested resource by calling the release submodule in the third-party program library after the calling is completed.

12. A software platform for the software platform-specific function disassembling and calling method for a third-party program library according to claim 11, comprising:

a software platform header file, a software platform API list, a software platform version number, a list of a user logic callback submodule, and a user function logic submodule.

13. A third-party program library for the software platform-specific function disassembling and calling method for a third-party program library according to claim 11, comprising:

an initialization submodule, a capability obtaining submodule, an internal submodule, and a release submodule.

14. A software platform for the software platform-specific function disassembling and calling method for a third-party program library according to claim 1, comprising:

a software platform header file, a software platform API list, a software platform version number, a list of a user logic callback submodule, and a user function logic submodule.

15. A third-party program library for the software platform-specific function disassembling and calling method for a third-party program library according to claim 1, comprising:

an initialization submodule, a capability obtaining submodule, an internal submodule, and a release submodule.

* * * * *